March 25, 1924. 1,488,329
J. ELLMAUER
AUTOMATIC EXPANSION VALVE
Original Filed Oct. 15, 1921  2 Sheets-Sheet 1
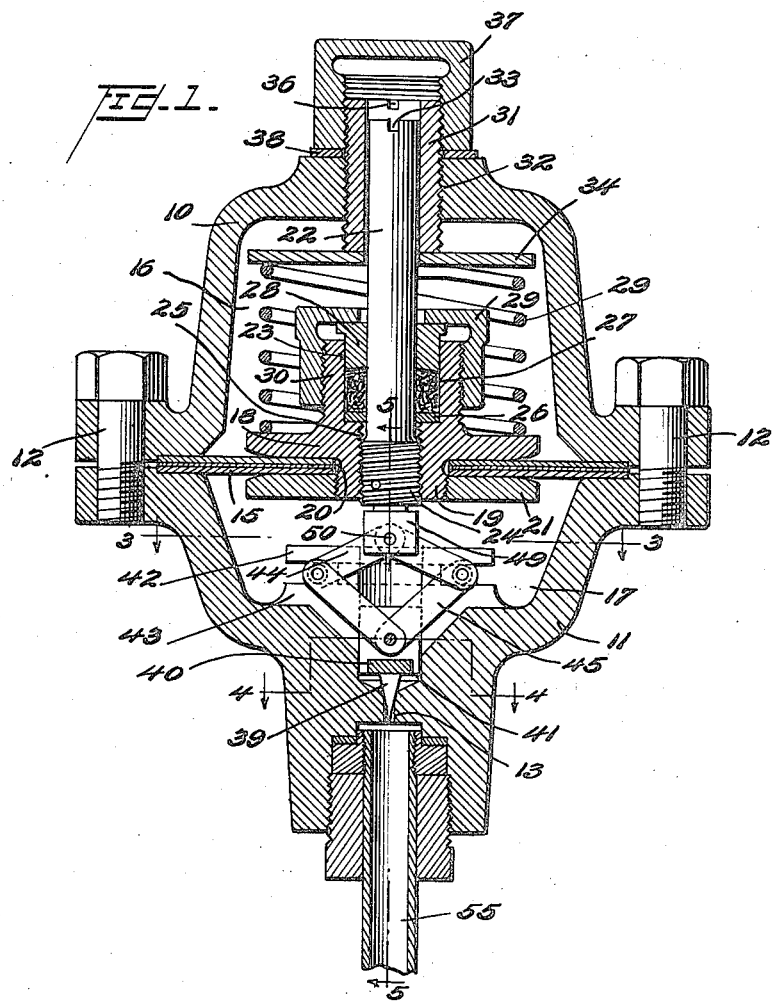
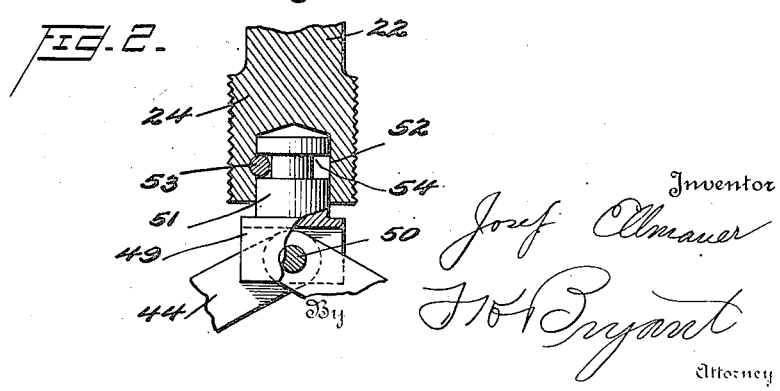
Inventor
Josef Ellmauer
F. K. Bryant
Attorney

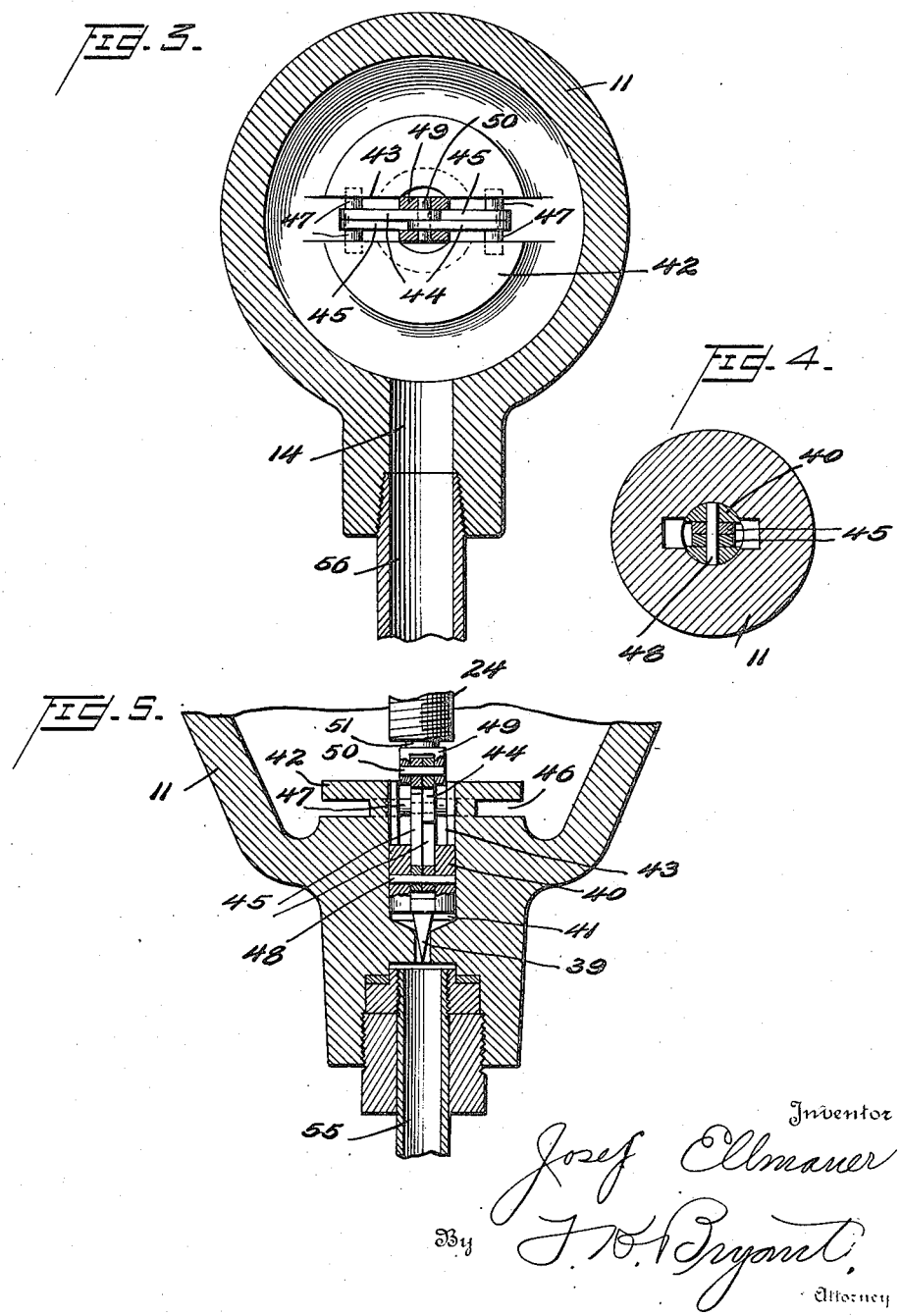

Patented Mar. 25, 1924.

1,488,329

UNITED STATES PATENT OFFICE.

JOSEF ELLMAUER, OF MILWAUKEE, WISCONSIN, ASSIGNOR TO REFRIGO CORPORATION, OF MILWAUKEE, WISCONSIN, A CORPORATION OF WISCONSIN.

AUTOMATIC EXPANSION VALVE.

Application filed October 15, 1921, Serial No. 507,962. Renewed February 11, 1924.

*To all whom it may concern:*

Be it known that I, JOSEF ELLMAUER, a citizen of the United States of America, residing at Milwaukee, in the county of Milwaukee and State of Wisconsin, have invented certain new and useful Improvements in Automatic Expansion Valves, of which the following is a specification.

The primary object of the invention is the provision of a device designed for obtaining close automatic regulation of the flow of gases, the same being more especially serviceable in connection with the circulating system of a refrigerating plant.

A further object of the invention is to provide an automatic gas regulating valve adapted for close adjustment for opening and closing upon any predetermined variation in the gas pressure, the device being easily installed and adjusted in any gas line and the valve being self-cleaning in its operation. A still further object of the invention is to provide an automatic gas valve structure that is self contained and provided with means for preventing escape of the gas upon any breaking or failure of operation on the part of the mechanism.

With these general objects in view the invention consists of the novel combination and arrangement of parts hereinafter more fully described in connection with the accompanying drawings and in which like reference characters designate corresponding parts throughout the several views.

In the drawings,

Figure 1 is a central vertical sectional view through the invention and the gas inlet conduit upon which the same is mounted, Figure 2 is an enlarged detailed sectional view of the swivel connection between the valve stem and toggle operating means taken upon an enlarged scale, Figure 3 is a horizontal transverse sectional view taken upon line 3—3 of Fig. 1, Figure 4 is a similar sectional view taken upon line 4—4 of Fig. 1, and Figure 5 is a vertical sectional view of the lower portion of the device taken upon line 5—5 of Fig. 1 with parts removed.

Referring more in detail to the drawings, my invention broadly includes a valve casing comprising upper and lower cup shaped sections 10 and 11 respectively secured together by tab bolts 12 with an inlet port 13 centrally provided in the bottom of the section 11 for the entrance of gas into the casing while a lateral outlet passage 14 is provided for the gas in the section 11 and the passage of gas through said inlet and outlet is automatically controlled by mechanism within the said casing and hereinafter described. A circular laminated diaphragm 15 secured between the sections 10 and 11 divides the interior of the casing into upper and lower chambers 16 and 17 respectively, both the port 13 and passage 14 communicating with the said chamber portion below the diaphragm 15.

A stuffing box 18 is centrally mounted upon the diaphragm 15 having a threaded extension 19 depending through a central opening 20 in the diaphragm 15 with a ring nut 21 threaded upon said extension 19 beneath the diaphragm 15 whereby the stuffing box 18 is secured to the diaphragm. A cylindrical valve stem 22 extends axially of the casing 10—11 through the recess 23 in the upper part of the stuffing box 18 and has a threaded lower portion 24 threaded into a reduced opening 25 in the lower end of the stuffing box 18. A washer 26 surrounds the stem 22 seated in the bottom of the recess 23 with suitable packing material 27 upon said washer and a gland 28 surrounding the stem 22 slidable in the upper end of the recess 23 for compressing the packing 27 during the adjustment of a stuffing nut 29 exteriorly threaded upon the upper portion 30 of the stuffing box 18.

The valve stem 22 is longitudinally adjustable within a sleeve 31 threaded through a central opening 32 in the top of the casing section 10, a kerf 33 in the valve stem serving to adjust the stem in its secured threaded engagement with the stuffing box 18 of the diaphragm 15. A circular plate 34 surrounds the stem 22 for contact with the lower inner end of the sleeve 31 while a coil spring 35 is tensioned between the plate 34 and the stuffing box 18 above the diaphragm 15. A groove 36 is provided in the upper end of the sleeve 31 for adjusting the latter and regulating the tension of the spring 35 for lowering the diaphragm 15 upon a predetermined gas pressure within the lower chamber 17. A closure cap 37 is threaded upon the upper end of the sleeve 31 engaging a gasket 38 upon the top of the casing section 10 and whereby gas is prevented from escaping from the casing 10—11, should leakage occur through injury to the diaphragm 15 or its connection with the stuffing box 18.

A conical needle valve 39 is provided for opening and closing the gas inlet port 13, the said valve being carried by a U-shaped plunger 40 vertically slidable in a central bore 41 in the bottom of the casing section 11 communicating with the port 13. A central internal boss 42 in the section 11 has a transversely cored slot 43 for accommodating upper and lower links 44 and 45 respectively by toggle operating means connected between the valve plunger 40 and the stem 22. An annular groove 46 is provided in the boss 42 receiving the projecting ends of the toggle pins 47 connecting the adjacent ends of the links 44 and 45 together while the lower ends of the toggle levers 45 are pivoted within the plunger 40 by a pin 48. A U-shaped swivel block 49 is pivoted to the upper ends of the links 44 by a pin 50 while a shank 51 of the block 49 is swiveled within a bottom socket 52 of the stem 22 by means of a pin 53 within a groove 54 of the shank 51. A gas pipe inlet 55 is secured in any desired manner in the lower end of the casing 10—11 communicating with the port 13 while a casing outlet pipe 56 for the passage 14 forms a part of the circulating system for the gas to be regulated.

The diaphragm 15 preferably consists of one or more metal disks of different material in laminated form as herein indicated, it being understood that the said diaphragm is so arranged as to be actuated by the pressure on the gas after it has passed the expansion needle valve 39, the said valve being arranged on the low pressure or expansion side for closing against the high pressure side of the system of which the pipe 56 forms a part. When an excess of gas above the predetermined amount passes the needle valve 39 the rising pressure in the lower chamber 17 raises the diaphragm 13 against the spring 35 causing the stem 22 to elevate and acting upon the toggle links 44 and 45 to lower the valve plunger 40 and needle valve 39 shutting off any further inflow of gas until the diaphragm 15 again lowers. An operation in the opposite direction caused by the lowering diaphragm 15 on a decrease of pressure in the system pipe 56 opens the valve 39 by means of the toggle levers 44 and 45, admitting the amount of gas for which the device has been set by the regulation of the spring 35 through the agency of the sleeve 31 as hereinafter set forth.

It will be seen that the stem 22 may be turned while the swivel block 49 and the toggle levers 44 and 45 as well as the valve plunger 40 remain stationary. The spring 35 imparts more positive action to the operation of the diaphragm 15 and causes it to automatically return to its normal position after each actuation.

What is claimed as new is:—

1. A gas regulating valve comprising a casing having a chamber, a flexible diaphragm transversely of the chamber, an inlet port in the bottom of the chamber, a stem adjustably connected centrally to the diaphragm axially of the casing, a needle valve for the inlet port, a U-shaped plunger on the valve, a U-shaped block swiveled in the lower end of the stem above the plunger, and pivotally connected toggle links pivoted within said block and plunger whereby the valve is adapted for closing upon the elevating of the diaphragm during an increase of gas pressure beneath the diaphragm.

2. A gas regulating valve comprising a casing having a chamber, a flexible diaphragm transversely of the chamber, an inlet port in the bottom of the chamber, a stem adjustably connected centrally to the diaphragm axially of the casing, a needle valve for the inlet port, a U-shaped plunger on the valve, a U-shaped block swiveled in the lower end of the stem above the plunger, pivotally connected toggle links pivoted within said block and plunger whereby the valve is adapted for closing upon the elevating of the diaphragm during an increase of gas pressure beneath the diaphragm, a central boss beneath the diaphragm having an annular groove and also having a transverse slot within which the toggle links are positioned when the device is assembled, and extended connecting pins between the outer ends of the toggle links positioned in opposite portions of said grooves adapted for lateral movement during the operation of the device.

3. A gas regulating valve comprising a casing having a chamber, a flexible diaphragm transversely of the chamber, an inlet port in the bottom of the chamber, a stem adjustably connected centrally to the diaphragm axially of the casing, a needle valve for the inlet port, a U-shaped plunger on the valve, a U-shaped block swiveled in the lower end of the stem above the plunger, pivotally connected toggle links pivoted within said block and plunger whereby the valve is adapted for closing upon the elevating of the diaphragm during an increase of gas pressure beneath the diaphragm, a sleeve adjustably mounted in the top of the casing through which the stem freely extends, a controlling spring tensioned between said sleeve and diaphragm, and an adjustable packing surrounding the stem.

4. A gas regulating valve comprising a casing having a chamber, a flexible diaphragm transversely of the chamber, an inlet port in the bottom of the chamber, a stem adjustably connected centrally to the diaphragm axially of the casing, a needle valve for the inlet port, a U-shaped plunger on the valve, a U-shaped block swiveled in the lower end of the stem above the plunger, pivotally connected toggle links pivoted within said block and plunger whereby the valve is adapted for closing upon the elevating of the diaphragm during an increase of gas pressure beneath the diaphragm, a central boss beneath the diaphragm having an annular groove and also having a transverse slot within which the toggle links are positioned when the device is assembled, extended connecting pins between the outer ends of the toggle links positioned in opposite portions of said grooves adapted for lateral movement during the operation of the device, a sleeve adjustably mounted in the top of the casing through which the stem freely extends, a controlling spring tensioned between said sleeve and diaphragm, and an adjustable packing surrounding the stem.

5. A gas regulating valve comprising a two-part casing, a circular diaphragm secured between the parts of the casing, adjusting means for the diaphragm, a valve stem adjustably carried by said adjusting means centrally of the casing and diaphragm, the casing having a chamber below the diaphragm provided with a gas inlet port, a needle valve for said port, a central boss within said chamber having a transverse slot communicating with said port, and toggle operating means within said slot pivotally connected between the stem and valve.

6. A gas regulating valve comprising a two-part casing, a circular diaphragm secured between the parts of the casing, adjusting means for the diaphragm, a valve stem adjustably carried by said adjusting means centrally of the casing and diaphragm, the casing having a chamber below the diaphragm provided with a gas inlet port, a needle valve for said port, a central boss within said chamber having a transverse slot communicating with said port, a block swiveled in the lower end of the stem, a plunger carried by the valve beneath said block, and toggle operating levers pivotally connected together and pivoted between said block and plunger.

7. A gas regulating valve comprising a two-part casing, a circular diaphragm secured between the parts of the casing, adjusting means for the diaphragm, a valve stem adjustably carried by said adjusting means centrally of the casing and diaphragm, the casing having a chamber below the diaphragm provided with a gas inlet port, a needle valve for said port, a central boss within said chamber having a transverse slot communicating with said port, a block swiveled in the lower end of the stem, a plunger carried by the valve beneath said block, toggle operating levers pivotally connected together and pivoted between said block and plunger, the said boss having an annular groove, and pin extensions at the points of connection between said toggle levers positioned within opposite portions of said groove whereby the valve is adapted for closing upon the elevating of said diaphragm and stem.

In testimony whereof I affix my signature.

JOSEF ELLMAUER.